United States Patent [19]

Wechner

[11] Patent Number: 4,865,184

[45] Date of Patent: Sep. 12, 1989

[54] CHAIN CONVEYOR DRIVE

[75] Inventor: Edward Wechner, Minnamurra, Australia

[73] Assignee: Joy Technologies Inc., Pittsburgh, Pa.

[21] Appl. No.: 158,530

[22] Filed: Feb. 22, 1988

[30] Foreign Application Priority Data

Mar. 5, 1987 [AU] Australia .................. PI0700

[51] Int. Cl.$^4$ .................................. B65G 23/06
[52] U.S. Cl. ........................ 198/834; 198/729
[58] Field of Search ............ 198/494, 497, 729, 834

[56] References Cited

U.S. PATENT DOCUMENTS 2,738,765  3/1956  Hart .................................. 198/834
4,445,878  5/1984  Linke et al. ..................... 198/497
4,580,676  4/1986  Michelbrink et al. ........... 198/497

FOREIGN PATENT DOCUMENTS 588981   6/1947  United Kingdom .
1033707  6/1966  United Kingdom .
2007328  5/1979  United Kingdom .

Primary Examiner—Joseph E. Valenza
Attorney, Agent, or Firm—Kirkpatrick & Lockhart

[57] ABSTRACT

A drive sprocket for a chain conveyor having one or more chains engaged therewith over a predetermined arc, leaving a disengaged arc of the sprocket. A housing is provided adjacent the disengaged arc incorporating a concave arcuate cylindrical surface closely spaced from the line swept by the tips of the sprocket teeth and forming a pumping chamber adapted to remove particulate material from the region of the drive sprocket.

3 Claims, 1 Drawing Sheet

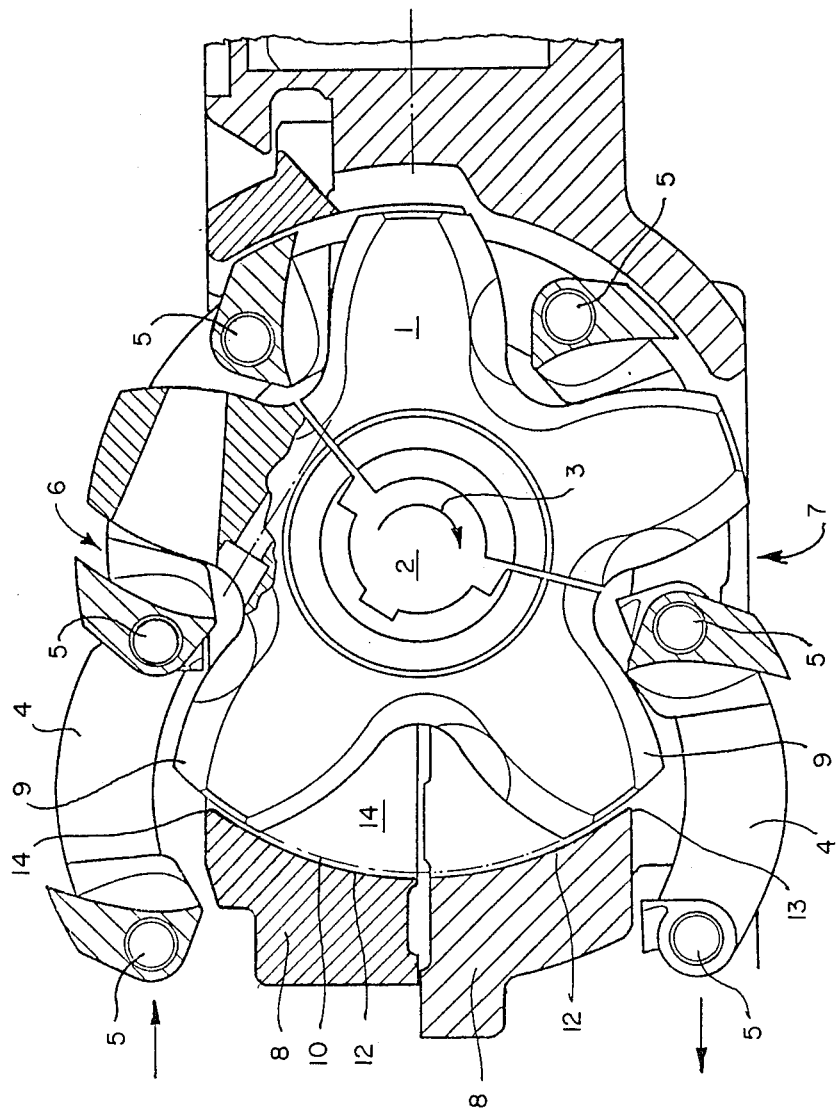

CHAIN CONVEYOR DRIVE

BACKGROUND OF THE INVENTION

This invention relates to a chain conveyor drive and has been devised particularly though not solely for use in the lateral face conveyor of a mining machine.

There are many applications where chain conveyors are used such as in mining machines, where they are required to convey particulate material such as coal incorporating significant portions of fines. Fines are generally defined as coal dust and particles less than 5 mm in size. The fines cause a problem with the conveyors by settling into the body of the conveyor, typically in the area of the drive sprocket, causing a build up of fines within the conveyor and promoting sprocket growth which can lead to jamming or stalling of the conveyor mechanism. It is therefore highly desirable to quickly and efficiently remove as much of the fines as possible from the area of the conveyor drive sprocket.

BRIEF SUMMARY OF THE INVENTION

The present invention therefore provides a chain conveyor drive comprising a sprocket mount on and roatated by a drive shaft such that a conveyor chain may be engaged with the sprocket over a predetermined engaged arc leaving the remaining arc of the sprocket disengaged over a disengaged arc, and a housing located adjacent the disengaged arc of the sprocket, said housing incorporating a concave arcuate cylindrical surface closely spaced from and following the line swept by the tips of the sprocket teeth over the disengaged arc, the arcuate length of the concave surface being equal to or greater than the pitch between the tips of adjacent teeth on the sprocket.

Preferably the links in the conveyor chain are large in size and the number of teeth on the sprocket therefore limited in number.

Preferably the sprocket has five to seven teeth.

BRIEF DESCRIPTION OF THE DRAWING

Notwithstanding any other forms that may fall within its scope, one preferred form of the invention will now be described by way of example only with reference to the accompanying drawing which is a cross sectional elevation through a chain conveyor drive sprocket according to the invention.

DETAILED DESCRIPTION OF THE PREFERRED EMBODIMENT

In the preferred form of the invention a chain conveyor, for example of the type used as lateral face conveyors in mining machines, incorporates a drive sprocket 1 mounted on and rotated by a drive shaft 2 in the direction shown by arrow 3. The drive sprocket engages the links 4 of a chain which are typically connected by link pins 5.

The chain is engaged with the sprocket over a predetermined engaged arc, typically of 180°, extending from the upper position 6 of the sprocket to the lower position 7 where the chain becomes disengaged from the sprocket. In this sense the sprocket has an engaged arc from position 6 in the direction of arrow 3 to position 7, and a disengaged arc from position 7 to position 6.

The conveyor drive is provided with a housing typically formed from castings 8 which is located adjacent the disengaged arc of the sprocket 1. The tips of the teeth 9 of the sprocket sweep a line 10 over the disengaged arc, and the housing is provided with a concave arcuate cylindrical surface 12 closely spaced from and following the line swept by the tips of the teeth 9. To this end the arcuate cylindrical surface has its axis coincident with the axis of the drive shaft 2.

The chain links 4 are preferably large in pitch, and the drive sprocket has a correspondingly small number of teeth, typified by the five teeth shown in the example in the accompanying drawing. The number of teeth could however be greater and typically five to seven teeth or even more.

The arcuate surface 12 has an arcuate length from edge 13 to edge 14 which is equal to or greater than the pitch between the tips of adjacent sprocket teeth 9. In this manner a "pumping chamber 14" is formed between the adjacent sides of adjacent teeth 9 and the arcuate surface 12. Any fines or other small particulate matter falling into the drive mechanism of the conveyor chain through the entry slots for the chain onto the drive sprocket 1, may be caught up between the adjacent teeth of the sprocket and forced upwards by a "pumping action" of the sprocket teeth in conjunction with the arcuate surface 12. In this manner the sprocket in conjunction with the housing 8 acts in a similar manner to a gear pump, effectively forcing or pumping the particulate fines upwardly from the locality of the drive sprocket to the upper run of the conveyor chain where they may be harmlessly discharged with the remainder of the conveyed material.

In this manner a chain conveyor drive is provided which is able to rid itself of fines dropping into the area around the drive sprocket by a pumping action and so to obviate problems of jamming or stalling otherwise caused by the build up of fines in this area.

What I claim is:

1. A chain conveyor drive comprising a sprocket mounted on and rotated by a drive shaft such that a conveyor chain may be engaged with the sprocket over a predetermined engaged arc leaving the remaining arc of the sprocket disenegaged over a disengaged arc, and a housing located adjacent the disengaged arc of the sprocket, said housing incorporating a concave arcuate cylindrical surface closely spaced from and following the line swept by the tips of the sprocket teeth over the disengaged arc, the arcuate length of the concave surface being substantially equal to the pitch between the tips of adjacent teeth on the sprocket.

2. A chain conveyor drive as calimed in claim 1 wherein the links in the conveyor chain are large in size and the number of teeth on the sprocket correspondingly limited in number.

3. A chain conveyor drive as claimed in claim 2 wherein the sprocket has five to seven teeth.

* * * * *

UNITED STATES PATENT AND TRADEMARK OFFICE
CERTIFICATE OF CORRECTION

PATENT NO. :  4,865,184

DATED      :  September 12, 1989

INVENTOR(S) :  Edward Wechner

It is certified that error appears in the above-identified patent and that said Letters Patent is hereby corrected as shown below:

Col. 2, line 55, delete "calimed" and substitute therefor --claimed--.

Signed and Sealed this

Sixth Day of August, 1991

*Attest:*

*Attesting Officer*

HARRY F. MANBECK, JR.

*Commissioner of Patents and Trademarks*